United States Patent
Tarfaoui

(10) Patent No.: US 11,296,369 B1
(45) Date of Patent: Apr. 5, 2022

(54) HOLLOW CYLINDRICAL SECONDARY BATTERY CELL SUITED FOR THERMAL MANAGEMENT

(71) Applicant: Ahmed Ben Amor Tarfaoui, Houston, TX (US)

(72) Inventor: Ahmed Ben Amor Tarfaoui, Houston, TX (US)

( * ) Notice: Subject to any disclaimer, the term of this patent is extended or adjusted under 35 U.S.C. 154(b) by 0 days.

(21) Appl. No.: 17/360,075

(22) Filed: Jun. 28, 2021

Related U.S. Application Data

(63) Continuation of application No. 17/176,070, filed on Feb. 15, 2021, now Pat. No. 11,088,401.

(51) Int. Cl.
  *H01M 10/643* (2014.01)
  *H01M 50/107* (2021.01)
  *H01M 10/0525* (2010.01)

(52) U.S. Cl.
  CPC ..... *H01M 10/643* (2015.04); *H01M 10/0525* (2013.01); *H01M 50/107* (2021.01)

(58) Field of Classification Search
  CPC ........... H01M 10/643; H01M 10/0525; H01M 50/107
  USPC ......................................................... 429/163
  See application file for complete search history.

(56) References Cited

U.S. PATENT DOCUMENTS

2012/0114995 A1* 5/2012 Qiu ................... H01M 10/0587
                                                              429/94

* cited by examiner

*Primary Examiner* — Gary D Harris

(57) ABSTRACT

The present invention is focused on the making of an integral tubular battery pack of hollow cylindrical battery cells better suited for thermal management. The hollow cylindrical cell structure is made of two concentric cylinders within which the electrode assembly is mounted. The inner hollow cylindrical cell structure exterior' surface is the newly added feature as it provides additional area for heat transfer with the cell' surrounding. The newly designed hollow cylindrical cells' lithium-ion battery packs are equipped with thermal management system and used in large storage facilities and industrial batteries applications such as EVs and large-scale machines in general.

5 Claims, 6 Drawing Sheets

HOLLOW CYLINDRICAL SECONDARY BATTERY CELL SUITED FOR THERMAL MANAGEMENT

CROSS REFERENCE TO RELATED APPLICATIONS

This application is a continuation of U.S. patent application Ser. No. 17/176,070 filed on Feb. 15, 2021, now U.S. Pat. No. 11,088,401 B1. Priority to this patent application is expressly claimed, and the disclosure thereof is hereby incorporated by reference in its entirety.

BACKGROUND OF THE INVENTION

1. Field of the Invention

The present invention relates to the making of a hollow cylindrical lithium-ion rechargeable battery pack with integral thermal management. The new hollow shaped battery cell provides an additional surface area for cooling and heating and therefore allows for an increase in capacity and life of the battery cell and battery packs thereof.

2. Description of the Related Art

Batteries for electric vehicles are made by the packing of rechargeable lithium-ion cells of 18650 type or other newly developed cells. All cells developed to date are of full cylindrical or rectangular shape. Hundreds of lithium-ion cells are packed in a single module, and multiple modules are connected to each other to form the full battery pack comprising thousands of cells. The high number of cells requires an efficient cooling system to prevent the batteries from heating during operation and recharging. Similarly, when the temperature of the surrounding is below 0° C., a heating system is required. It is desirable that the thermal fluid reaches each individual cell proximity and provides a uniform temperature throughout the cells so to avoid hot spots and damage of the cells. The cells must be insulated from the thermal fluid to prevent loss of electric power to the surrounding and to protect against fire and corrosion and to provide for safe operation and durability of the battery pack.

U.S. Pat. No. 10,886,512 B2 to Bourke et al. (issued Jan. 5, 2021) gives an example of newly design battery pack with a thermal management system. All cells are mounted in parallel and the vicinity of each cell is reached by vertical fin like connectors that are part of a horizontal base plate. The mode of operation of the battery and weather conditions determines whether the plate is heated or cooled through fluid circulation. The presence of hot spots is likely because the fluid circulates only through the base plate and relies on the fins or stagnant fluid film to conduct heat further away from the cells to the base plate. Heating the module during winter can be a challenge because of lack of insulation and loss of heat to the surrounding since all cells are open to each other.

U.S. patent Ser. No. 10/340,565 B2 to Kim et al. (issued Jul. 2, 2019) claims that a tube through which fluid flows, is mounted on the perimeter of a plate like fin, and in turn the fin is in contact of a battery of rectangular shape referred to as a battery cell. The larger the battery, the less efficient the heat removal, and the smaller the battery the less the energy density obtained because of the space taken by the dimensions of the tube, the fin and the frame.

U.S. Pat. No. 10,897,067 B2 to Sekiya et al. (issued Jan. 19, 2021) claims that a cooling water pipe mounted on the perimeter of a heat transfer sheet, and in turn the sheet is fixed to the lower surface of the battery module of rectangular shape. This system is similar to U.S. patent Ser. No. 10/340,565 B2 to Kim et al.

U.S. Pat. No. 10,886,580 B2 to Butterfield et. al. (issued Jan. 5, 2021) claims that each cylindrical battery cell is attached to a cooling plate which in turn may comprise channels of cooling fluid. This system is similar to U.S. patent Ser. No. 10/340,565 B2 to Kim et al. and U.S. Pat. No. 10,897,067 B2 to Sekiya et al. Heat exchange is also not efficient and hotspots are likely to occur.

U.S. Pat. No. 10,868,347 B2 to Pucher (issued Dec. 15, 2020) claims that a cooling plate which in turn may comprise one or more cooling tubes molded within. This system is similar to U.S. patent Ser. No. 10/340,565 B2 to Kim et al. and U.S. Pat. No. 10,897,067 B2 to Sekiya et al.

U.S. Pat. No. 10,305,153 B2 to Rinker et al. (issued May 28, 2019) claims a vehicle battery system including a battery cell and a micro heat exchanger. The micro heat exchanger includes at least a fluid tube in direct contact with the battery cell. The micro heat exchanger can be between 10 nm and 1000 nm and positioned at predetermined position within or on the outer surface of the battery cell of the type 18650, or other sizes or styles such as 18350, and 18500. The micro heat exchanger can be of multiple patterns such as cross hatched, a pin, a spiral or helicoid, serpentine, parallel and interdigitated. The flow through the micro heat exchanger is expected to be very low due to its size and the heat transfer area is also very small.

U.S. Pat. No. 9,419,316 B2 to Meyer et al. (issued Aug. 16, 2016) claims a serpentine fluid circulating tube around part of the periphery of a plurality of electric cells. The cells are connected to interleaved fins which in turn are connected to the circulating tube. This limits the number of cells and reduces the energy density considerably. Heat exchange is also not efficient and hotspots are likely to occur.

It is desirable to build a large pack for industrial application where the heat generated during usage, or during charge and discharge of the battery is manageable and without safety concerns. All the thermal management systems mentioned above design around the classic full cylindrical or rectangular cell which was originally designed for small electronic devices and without the need for thermal management system. The present invention provides a hollow cylindrical cells' battery pack make that is better suited for thermal management because of the added surface area available for heat transfer.

SUMMARY OF THE INVENTION

The invention as claimed provides a novel hollow cylindrical cells' battery pack better suited for thermal management. Large battery packs of these hollow cylindrical cells are useful for electric vehicles, and machinery as well as the storage and transport of large quantities of electric energy. The invention uses lithium-ion technology to build the hollow cylindrical battery pack characterised by a large contact surface area for heat transfer and therefore better suited for thermal management.

The hollow cylindrical cell within the battery pack in the invention as claimed is made of two concentric cylinders that hold the Jelly roll as known in the field of lithium ions cells in between the outer surface of the inner cylinder and the inner surface of the outer cylinder. The loss in capacity due to the removal of the classic jelly roll core, can be easily made up for by fewer rolls around the large perimeter. Any thermal pack design can be easily adopted with minor changes, to flows over both cylinders' exterior surfaces and provide a better thermal management of each cell.

There is always a trade off between energy density and heat removal for safe recharge of lithium-ion cells. This invention provides a design that is safe and most efficient in heat exchange because of the belief that chemical systems for batteries will improve and will become more energy dense and resilient and the demand for more efficient systems of heat exchange is likely to increase. Also, these cells' packs may find applications in energy storage facilities or larger vehicles such as buses and inner city driving where more heat will be generated due to frequent acceleration and deceleration.

BRIEF DESCRIPTION OF THE INVENTION

The primary focus of the present invention is to provide for the make of a hollow cylindrical cell tubular battery pack better suited for thermal management application. The newly designed lithium-ion tubular battery pack is useful for large storage facilities and industrial batteries applications such as EVs and large-scale machines in general.

FIG. 1 is an illustration of a hollow cylindrical cells 100 to be used in the tubular battery pack. The rolled electrode assembly 130 starts at the initial outer perimeter of the inner cylinder 101 in accordance with an embodiment of this invention. The bottom plate 112 is attached to the cell's anode and insulated from the cylindrical wall 110 using internal insulating plate 111. An insulating O-ring 121 is added under the insulating plate 120 and assure that the cell remains leak tight. The inner wall 101 of the hallow cylindrical cell is made of a conductive metal and it is also insulated from the electrodes of the cell to prevent the leak of power to the environment.

FIG. 2 is an illustration of a tubular battery pack 200 of the lithium-ion hollow cylindrical cells 100. The tubular battery pack is also referred to as a module. The tubes 110, attached from both ends to two fixed tube-sheets 202, are open to a closed chamber 201 and release any gases that are generated from the cells through safety vent 2011.

The tube-sheets 202 are fixed to shell 203. Thermal fluid is circulated in and out of the shell 203 through nozzles 2031 and 2032 and heat is exchanged between the tubes' outer walls and the fluid in accordance with an embodiment of this invention The tube-sheets 202 also serve as flanges for the attachment of the closure 204 and covers 205 in accordance with an embodiment of this invention.

Anode 206 and cathode 207 are enclosed within their insulated plates and seal the modular battery pack 200 from both ends. The anode and cathode are connected to a battery management system (BMS) 208 for safety of cells during usage and recharge.

FIG. 3A and FIG. 3B show a circular and rectangular tube-sheet 202. The number of tubes is optimized so the distance between any adjacent holes is ¼ inch or 1.25 times the diameter of the tube. The diameter added to the distance between two adjacent holes is referred to as the pitch 2021. The tube holes are arranged in a triangular pitch 2022 or rotated square pitch 2023 relative to the direction of flow of the thermal medium as shown by the arrows in both FIGS. 3A and 3B. The triangular and rotated square pitch are the preferred tube configuration.

Figure 6:
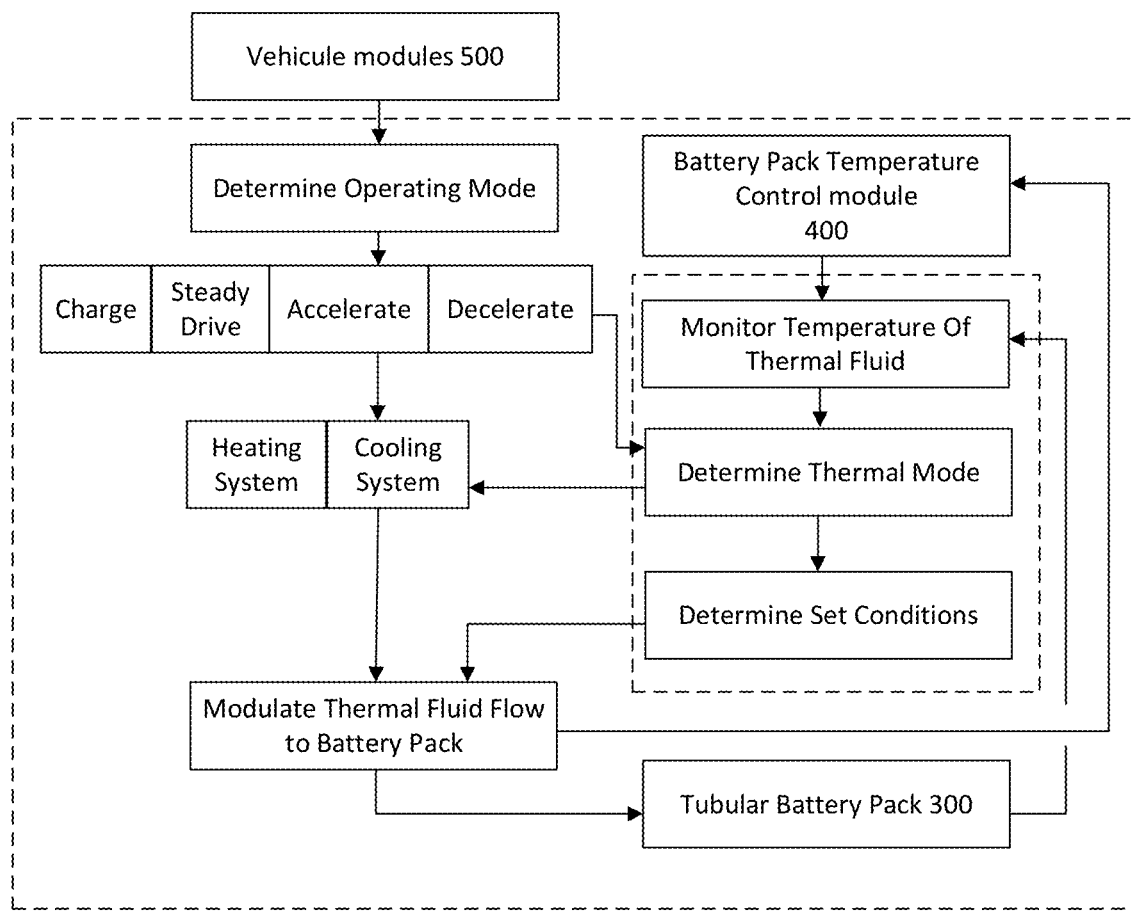

FIG. 6 provides a logic tree for the function of the battery temperature control module 400 in relation to the vehicle modules 500. The outlet temperature of the battery is monitored by the temperature control module 400 which determine the set conditions and thermal mode of either heating or cooling based on the operating mode of the vehicle from the vehicle modules 500, and sets the flow rate of thermal fluid circulation.

DETAILED DESCRIPTION OF THE INVENTION

The present invention is focused on the making of hollow cylindrical cell battery pack better suited for thermal management. The newly designed lithium-ion battery packs are useful for large storage facilities and industrial batteries applications such as EVs and large-scale machines in general.

The embodiments of the invention in which an exclusive propriety or privilege is claimed are presented below:

1. A hollow cylindrical battery cell is made of two concentric cylinders wherein the electrodes roll assembly is placed in between the outer surface of the inner cylinder and the inner surface of the outer cylinder. The loss in capacity due to the removal of the core of the electrode assembly roll is made up for by the addition of rolls at the outer surface. The concentric cylinders are made out of highly conductive material and known for excellent resistance to corrosion such as but not limited to aluminum or stainless steel 316 or 304. The inner cylinder has standard nominal diameter sizes of between 0.25 to 1.5 in while the outer cylinder has a nominal diameter of 1 to 3 in. When the goal is to build standard cells, both cylinders are cut to proper length of a single lithium-ion cell of 2.56 in (65 mm) to 2.76 in (70 mm) plus tolerance. The prepared hollow cylindrical cell can be made of any dimensions as the only limitation is the ability of the thermal management system to deal with such length and the available space constrains to design to.

Figure 1:
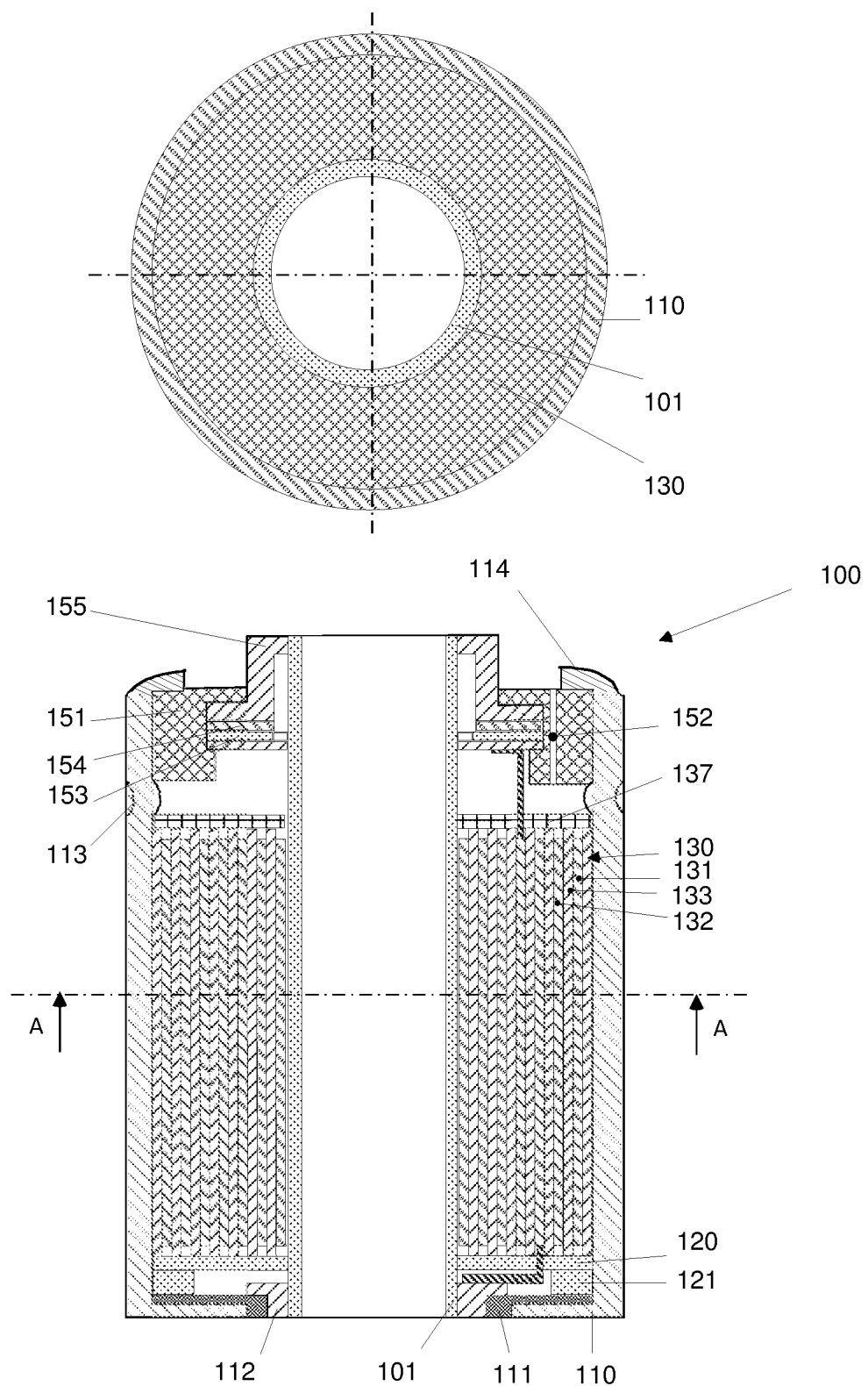

FIG. 1 is an illustration of a hollow cylindrical cell 100. The rolled electrode assembly 130 starts at the initial outer perimeter of the inner cylinder 101. The bottom plate 112 is attached to the cell's anode and insulated from the cylindrical wall 110 using internal insulating plate 111. An insulating O-ring 121 is added under the insulating plate 120 and assure that the cell remains leak tight. The inner wall 101 of the hallow cylindrical cell is made of a conductive metal and it is also insulated from the electrodes of the cell to prevent the leak of power to the environment.

The outer cylinder 110 has an indented part 113 and inward bent 114 to hold the cap assembly 151 in place. A second insulating plate is 137 is disposed on top of the electrode assembly 130. A safety vent 152 will deform and rupture when the internal pressure of the cell reaches 2.8 MPa (406 psig). Gasket 151 is used to insulate the cathode 155 from the cylindrical wall 110. When vent 152 is open, circuit module 153 is damaged due to overpressure and interrupts current flow. A positive temperature coefficient device (PCT) 154 is able to interrupt current over-flow.

2. A plurality of the outer cylinder of the hollow cylindrical cell of embodiment 1 are first inserted into two tube-sheets that are in turn attached to a rectangular or cylindrical shell to form a fixed leak tight shell and tube heat exchanger configuration. The lithium-ion electrodes roll and inner cylinder of embodiment 1 are then mounted within the outer cylinders to form the final battery assembly. Such assembly is unique and referred to as integral tubular battery pack. The tube-sheets form the flanges to the shell from both sides for further attachment of other components, such as a safety relief system and the electrodes of the battery.

Figure 2:
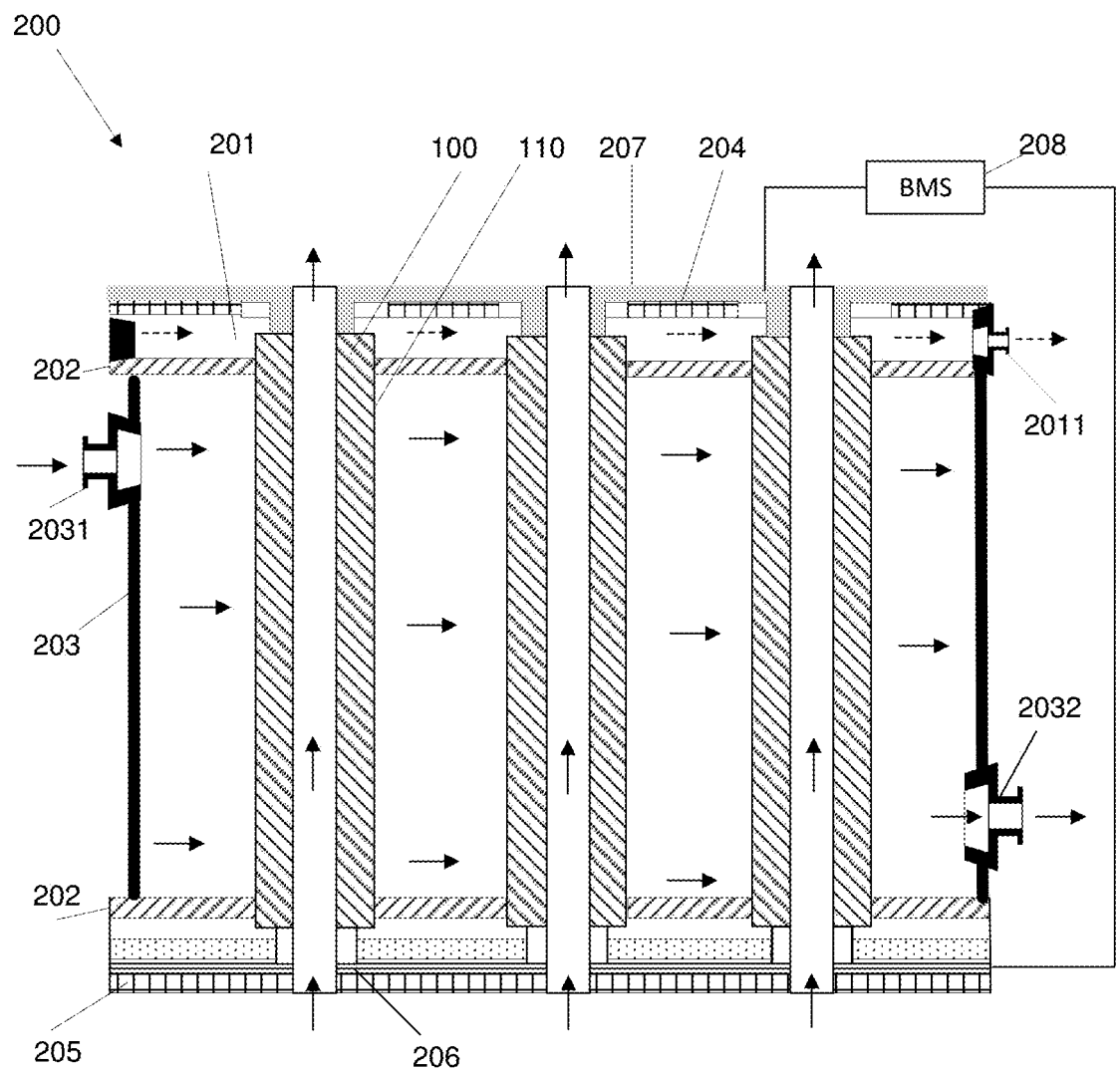

FIG. 2 is an illustration of a tubular battery pack 200. The tubes 110 of lithium-ion hollow cylindrical cell 100 are attached from both ends to two fixed tube-sheets 202, and open to a closed chamber 201 to release any gases that are generated from the cells through safety vent 2041.

The tube-sheets 202 are fixed to shell 203. The tube-sheets 202 also serve as flanges for the attachment of the closure 204 and covers 205.

Figure 3A:
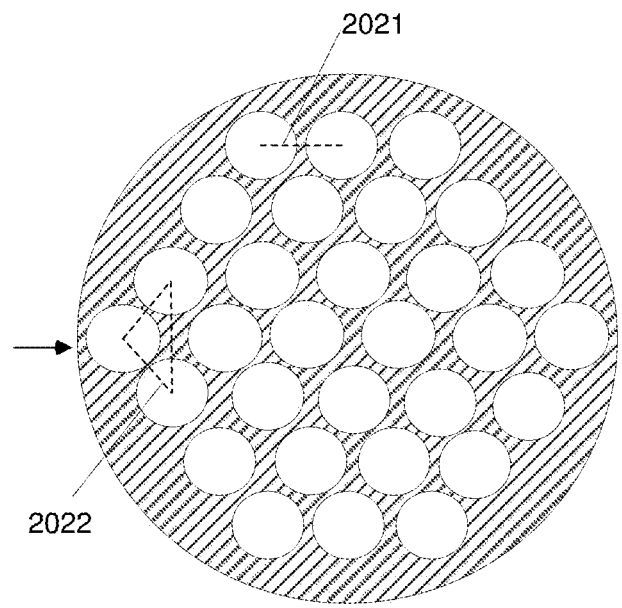
Figure 3B:
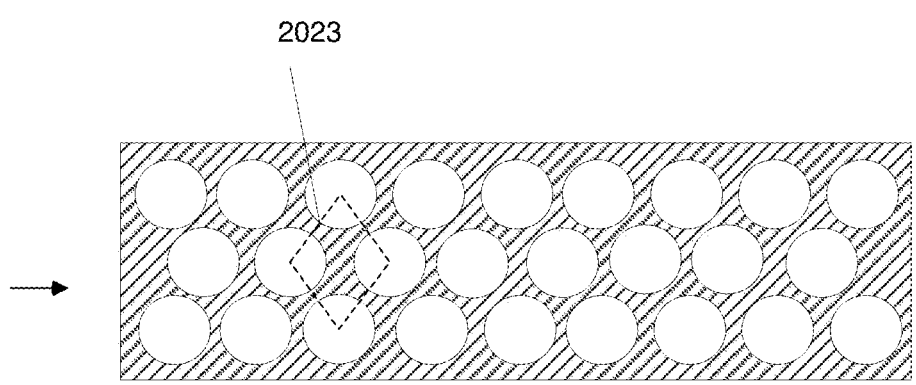
Figure 4A:
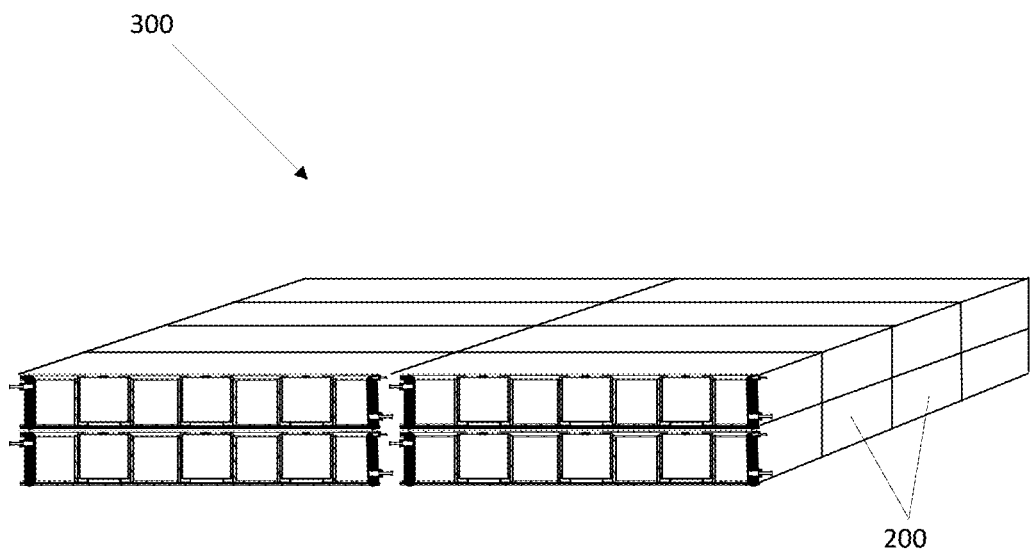
FIG. 4A shows multiple modules 200 assembled into a battery pack 300. The lithium-ion cell orientation is vertical in accordance with an embodiment of this invention.
Figure 4B:
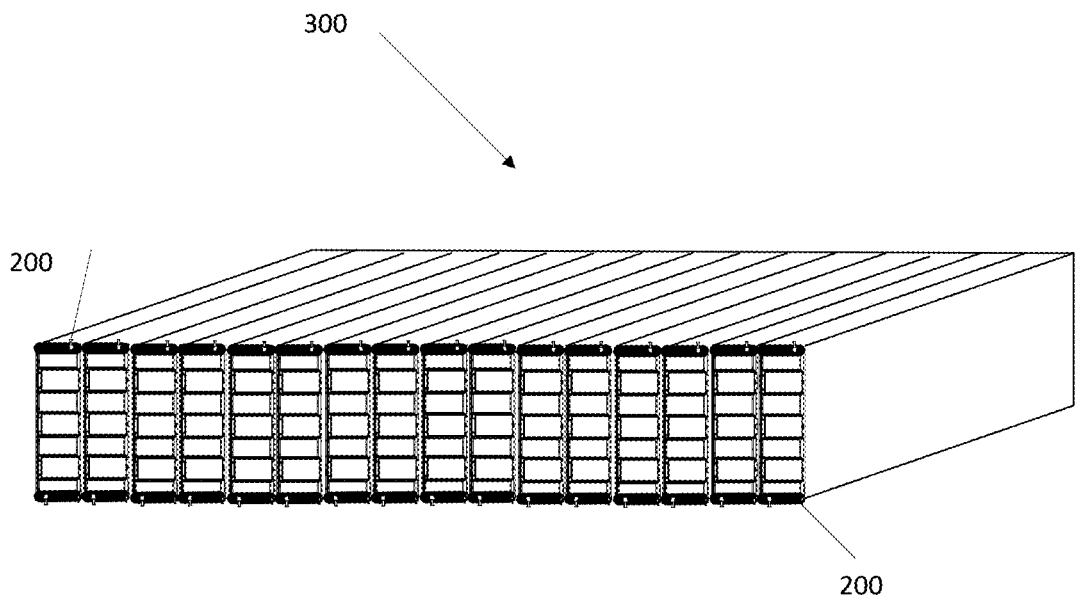
FIG. 4B shows multiple modules 200 assembled into a battery pack 300. The lithium-ion cell orientation is horizontal in accordance with an embodiment of this invention.
Figure 5:
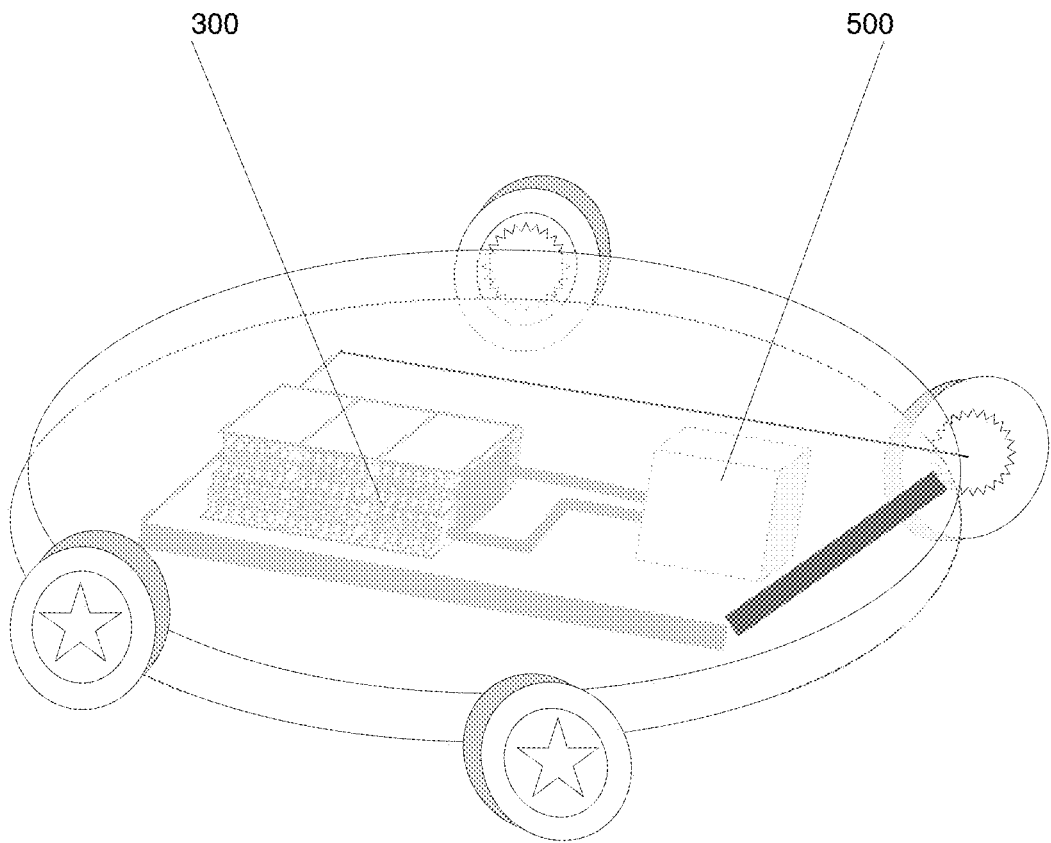
FIG. 5 shows tubular battery pack 300 mounted on the chassis of a vehicle in relation with other vehicle modules 500.

Anode 206 and cathode 207 are enclosed within their insulated plates and seal the modular battery pack from both ends. The anode and cathode are connected to a battery management system (BMS) 208 for safety of cells during usage and recharge.
The integral tubular battery electrodes have connections to the tube ends but not the tube' walls. and only heat is conducted through the tube walls to the thermal fluid circulating in and out of the shell. The tubes are arranged in a triangular or rotated square pitch as shown by FIG. 3A and FIG. 3B. FIG. 2 shows thermal fluid circulation in and out of the shell 203 through nozzles 2031 and 2032, and heat is exchanged between the tubes' outer walls and the fluid.
The inlet temperature of the thermal fluid is always constant as it is defined by the conditioning system output. The outlet temperature is variable and depends on the battery heat generation. This outlet temperature is monitored and controlled by the temperature control module 300 in FIG. 5 in the temperature range requirement of 0° C. to 50° C. Thermal fluid can be glycol base or other eco-friendly known fluid.

3. Multiple tubular batteries or modules of embodiment 2 are assembled together to form a final electric vehicle battery pack that is intended to be installed on the chassis of the vehicle.

The size of the hollow cylindrical cell is dictated by the need of the electrical motor for maximum voltage, maximum current requirement and available space. In this embodiment, three examples are given. The first and second examples are for vertical vs. horizontal cylindrical cell orientation, for a battery pack of mid size car with 4 ft×5 ft available chassis area. The third example is for a larger chassis such as that of a school bus of 40 ft×8 ft.

First, in a 4 ft×5 ft×9 in rectangular box one can pack 805 cells of the type 1.00/1.75-inch inner to outer diameter hollow cylindrical cells and a cell length of 7 inches, and positioned in vertical configuration. One hollow cylindrical cell in this example is equivalent with 10 cells of 18650 classical type (2600 mAh, 3.7 V). The battery pack in this example has 77 kWh.

Second, in a 4 ft×5 ft×9 inches rectangular box one can pack 105 of the type 1.00/1.75-inch inner to outer diameter hollow cylindrical cells and a cell length of 4 ft, and positioned in horizontal configuration. One hollow cylindrical cell in this example is equivalent with 69 cells of 18650 classical type (2600 mAh, 3.7 V). The battery pack in this example has 70 kWh.

Third, when a school bus chassis box of 40 ft×8 ft×9 inches is used with 1.00/1.75-inch inner to outer diameter hollow cylindrical cells of 7 inches long in vertical configuration. One can pack 12696 hollow cylindrical cells, and up to 1.2 MWh battery is achievable and capable of running a 200 hp motor for 8 hours.

What is claimed is:

1. An integral tubular battery, having a plurality of modules, where each module comprises one rechargeable tubular battery pack, and where each tubular battery pack is made out of a plurality of tubes, wherein the tubes are fixed from both ends into two tube-sheets, and wherein the said tube-sheets are attached to a rectangular or cylindrical shell to form a fixed and leak tight shell and tube heat exchanger configuration, wherein each of the tubes is a hollow cylindrical rechargeable lithium-ion battery cell, made out of two concentric cylinders, where the electrode roll is placed between the outer surface of the inner cylinder and the inner surface of the outer cylinder to form a hollow cylindrical cell configuration, wherein the hollow cylindrical cell configuration adds 25% to 40% in exterior surface area available for heat transfer for heating and cooling of the lithium ion electrode rolls mounted within, and wherein the tubular battery stores from 50 kWh to 1.5 MWh within the hollow cylindrical lithium-ion cells.

2. The integral tubular battery of claim 1 wherein the concentric cylinders of the hollow cylindrical rechargeable lithium-ion battery cells have nominal diameters that vary between 0.25 and 1.5 inch for the inner cylinder and 1 inch to 3 inches for the outer cylinder.

3. The integral tubular battery of claim 1 wherein the length of concentric cylinders of the hollow cylindrical rechargeable lithium-ion battery cell varies between 2.6 inch and 5 ft.

4. The integral tubular battery of claim 1 wherein the hollow cylindrical rechargeable lithium-ion battery cells' capacity is between 12 Ah and 220 Ah.

5. The integral tubular battery of claim 1 wherein the shell of tubular battery pack has two nozzles for the circulation of thermal fluid for heating and cooling of the outer cylinders of the hollow cylindrical cells, wherein the same thermal fluid or different thermal fluid is circulated through the inner cylinders of the hollow cylindrical cells.

* * * * *